(12) United States Patent
Granger

(10) Patent No.: US 10,082,132 B2
(45) Date of Patent: Sep. 25, 2018

(54) ENERGY-SAVING EQUILIBRIUM MECHANISM, ROTATING MACHINE AND METHOD OF IMPLEMENTATION

(71) Applicant: Maurice Granger, Saint Priest en Jarez (FR)

(72) Inventor: Maurice Granger, Saint Priest en Jarez (FR)

(*) Notice: Subject to any disclaimer, the term of this patent is extended or adjusted under 35 U.S.C. 154(b) by 0 days.

(21) Appl. No.: 15/322,306

(22) PCT Filed: May 13, 2016

(86) PCT No.: PCT/FR2016/051132
§ 371 (c)(1),
(2) Date: Dec. 27, 2016

(87) PCT Pub. No.: WO2017/064379
PCT Pub. Date: Apr. 20, 2017

(65) Prior Publication Data
US 2017/0298910 A1 Oct. 19, 2017

(30) Foreign Application Priority Data

Dec. 30, 2015 (WO) .................. PCT/FR2015/053769
Jan. 27, 2016 (WO) .................. PCT/FR2016/050166

(51) Int. Cl.
*F03G 3/00* (2006.01)
*F03G 7/08* (2006.01)
(Continued)

(52) U.S. Cl.
CPC .................. *F03G 7/08* (2013.01); *F03G 3/06* (2013.01); *F02B 75/02* (2013.01); *F02B 2075/025* (2013.01); *F02B 2075/027* (2013.01)

(58) Field of Classification Search
CPC ..... F03G 3/06; F03G 7/08; F03G 7/10; F03G 3/00
See application file for complete search history.

(56) References Cited

U.S. PATENT DOCUMENTS 5,150,626 A * 9/1992 Navarro .................... F03G 3/00
74/61
5,890,400 A 4/1999 Oades
(Continued)

FOREIGN PATENT DOCUMENTS

CA 2851867 11/2015
EP 1031760 A1 2/2000
(Continued)

OTHER PUBLICATIONS

International Search Report and Written Opinion, dated Oct. 13, 2016, in connection with International Application No. PCT/FR2015/053769, 10 pages.
(Continued)

*Primary Examiner* — Phillip A Johnson
(74) *Attorney, Agent, or Firm* — Meunier Carlin & Curfman LLC

(57) ABSTRACT

The present invention concerns a mechanism (1), comprising: one support (2) including a base (3), one pendulum (4), and connecting suspension rods (5) articulated on the base (3) and on the pendulum (4); two mobile cog wheels (12; 22) in rotation around their respective axis (A1; A2); two eccentric elements (14; 24) integral with the cog wheels (12; 22) in rotation and generating moments of gravity force around their axis (A1; A2); and one connecting link rod (60; 160) comprising a rotary head (62) and an eccentric head (63). The axis (A1; A2) are parallel within a horizontal or vertical reference plane (P0). The pendulum (4) supports the axis (A1; A2) of the cog wheels (12; 22) and of the eccentric elements (14; 24). The connecting rods (5) are slanting in accordance with an angle comprised between 45 degrees and 80 degrees in relation to a vertical plane. The cog wheels (12; 22) engage one with the other using a unitary transmission ratio and are mobile in rotation in opposing directions. When the mechanism (1) is in operation, the eccentric (Continued)

elements (14; 24) follow an elliptical movement, whereas the pendulum (4) follows a travel movement having a vertical component and a horizontal component. The moments of gravity force of the eccentric elements (14; 24) have a same value and a same direction, both being variable depending on their angular position around the axis (A1; A2). For each angular position of the cog wheels (12; 22) and of the eccentric elements (14; 24) around the axis (A1; A2), the mechanism (1) presents an equilibrium configuration at rest.

21 Claims, 12 Drawing Sheets

(51) Int. Cl.
  *F03G 3/06*   (2006.01)
  *F02B 75/02*  (2006.01)

(56) References Cited

U.S. PATENT DOCUMENTS 8,307,652 B1 * 11/2012 Gallistel .............. F03G 3/00
                                                    475/255

2006/0220385 A1   10/2006   Stanciu

FOREIGN PATENT DOCUMENTS

| EP | 1369564 | 12/2003 |
| EP | 2781790 | 9/2014 |
| FR | 2811031 | 1/2002 |
| RU | 2354873 | 5/2009 |
| WO | 2008/037014 | 4/2008 |
| WO | 2015/163700 | 10/2015 |

OTHER PUBLICATIONS

International Search Report and Written Opinion, dated Nov. 10, 2016, in connection with International Application No. PCT/FR2016/050166, 10 pages.

International Search Report and written Opinion, dated Oct. 11, 2016, in connection with International Application No. PCT/FR2016/051132, 9 pages.

Non-final Office Action issued in co-pending U.S. Appl. No. 15/322,295, dated Jan. 12, 2018 (23 pages).

* cited by examiner

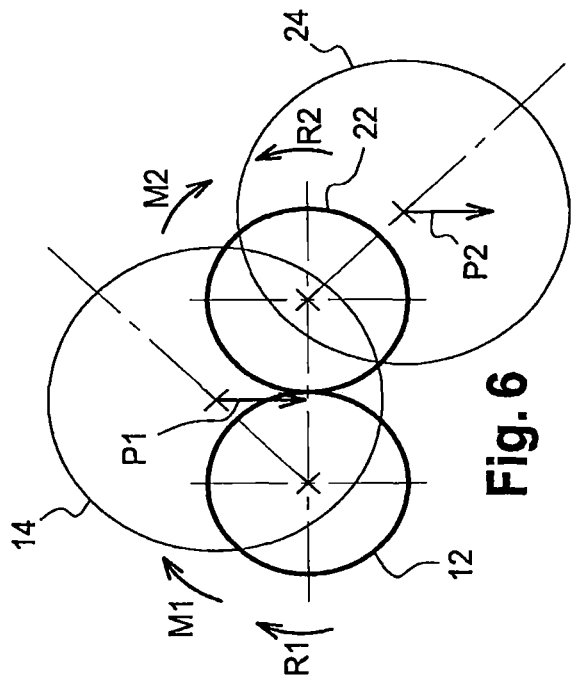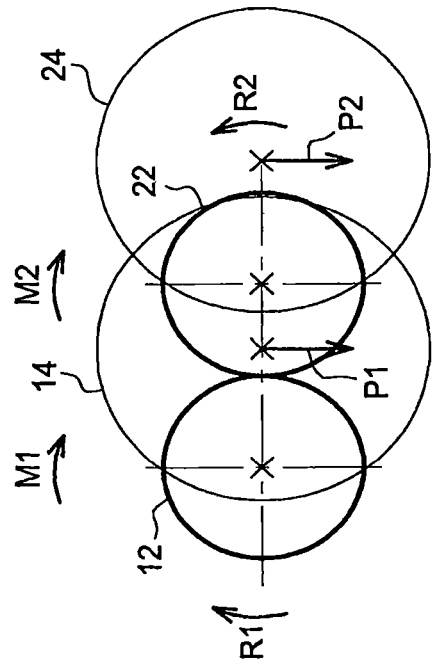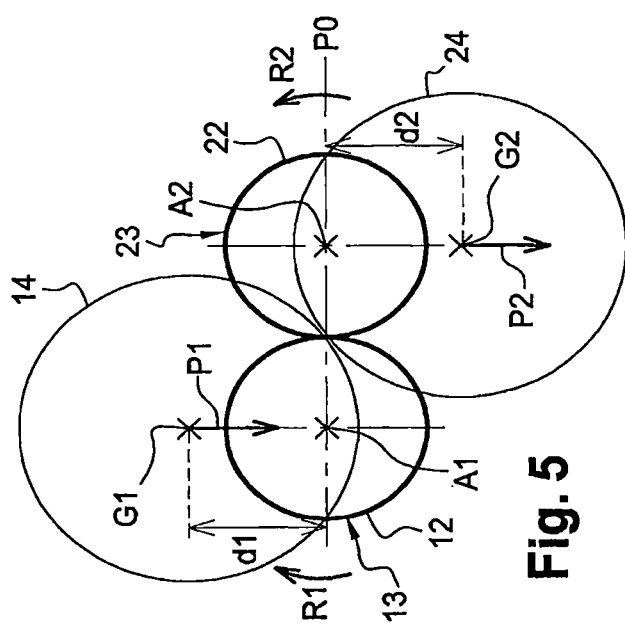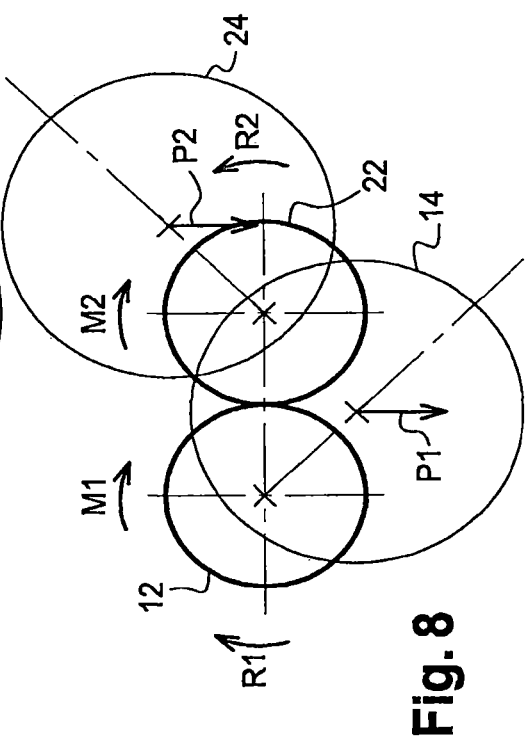
Fig. 5
Fig. 6
Fig. 7
Fig. 8

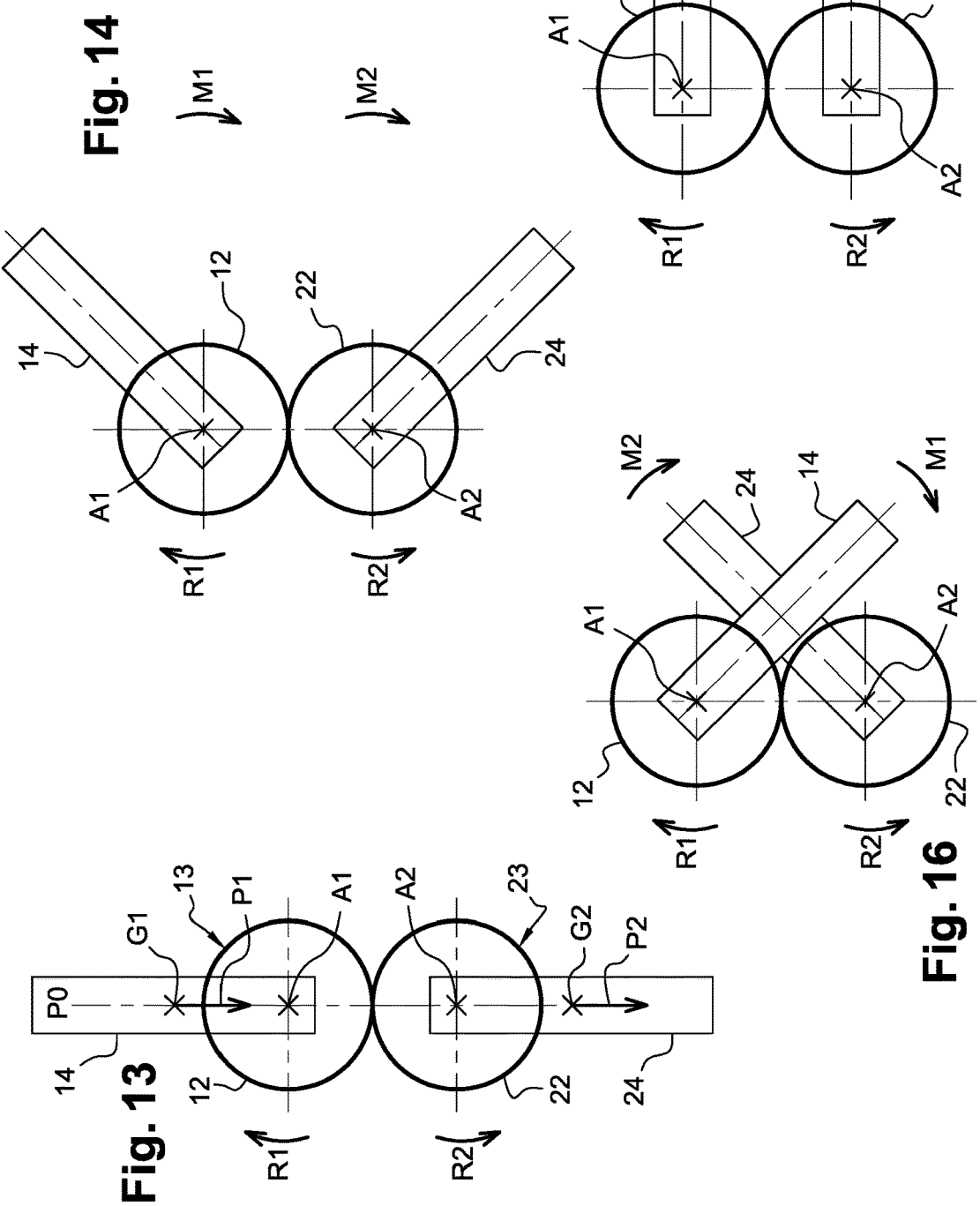

ENERGY-SAVING EQUILIBRIUM MECHANISM, ROTATING MACHINE AND METHOD OF IMPLEMENTATION

The present invention concerns an energy-saving equilibrium mechanism, in any feasible application, and notably rotating machines.

The invention also concerns a rotating machine, for example a motor, a generator or a mixer, comprising at least one such mechanism. The invention particularly concerns a motor comprising several mechanisms.

The invention finally concerns an implementation method of such a mechanism.

In the mechanical field, many movement transmission mechanisms exist, such as epicyclic gear trains or crankshafts, adapted to equip rotating machines. Nevertheless, the yields obtained with commonly-known mechanisms are not entirely satisfactory.

The aim of the present invention is to propose a mechanism enabling to economise energy and to improve the yield of a rotating machine.

For said purpose, the object of the invention is a mechanism, comprising: one support including a base, one pendulum suspended on the base, and suspension connecting rods articulated on the base and on the pendulum; a first mobile cog wheel in rotation in relation to the support around a first axis; a second mobile cog wheel in rotation in relation to the support around a second axis; a first eccentric element integral in rotation with the first cog wheel and generating a first moment of gravity force around the first axis; a second eccentric element integral in rotation with the second cog wheel and generating a second moment of gravity force around the second axis; and one connecting link rod comprising a rotary head mounted as a pivot link on a first shaft and an eccentric head mounted as an eccentric pivot link on a second shaft.

According to the invention, the axis are parallel within a horizontal or vertical reference plane. The pendulum supports the axis of the cog wheels and of the eccentric elements. The connecting suspension rods are slanting according to an angle comprised between 45 degrees and 80 degrees in relation to a vertical plane. For the connecting link rod, the first shaft is either a shaft supporting one of the cog wheels, or a shaft fixed on the base, whereas the second shaft is the other shaft among the shaft supporting one of the cog wheels and the shaft fixed on the base. The cog wheels engage one with the other using a unitary transmission ratio and are mobile in rotation in opposing directions. When the mechanism is in operation, the eccentric elements follow an elliptical movement, whereas the pendulum follows a travel movement having a vertical component and a horizontal component. The moments of gravity force of the eccentric elements have a same value and a same direction, both being variable depending on their angular position around the axis. For each angular position of the cog wheels and of the eccentric elements around the axis, the mechanism presents an equilibrium configuration at rest.

Hence, the invention enables to generate energy, due to the centrifugal force resulting from the movements of the eccentric elements and to the thrust or traction forces resulting from the movements of the pendulum.

The equilibrium of the eccentric elements and the centrifugal forces that they generate enable to reduce the energy necessary for the cog wheels and the eccentric elements in rotation. The more the centrifugal forces increase, the more said rotation is facilitated.

The slanting of the connecting suspension rods enables to modify the centre of gravity of the mechanism, in comparison with the connecting link rods which would be placed vertically to the equilibrium. The thrust or traction energy of the pendulum is significantly higher than the initial force which drives the eccentric elements in rotation. Once the mechanism is in motion, the centrifugal energy generated by the eccentric elements is significantly higher than the thrust or traction energy of the pendulum.

According to other advantageous characteristics of the mechanism according to the invention, taken individually or combined:

The eccentric elements have a same mass and same dimensions.

The cog wheels comprise a first wheel having a cog longer than the other cogs and a second wheel having a groove formed between two cogs, and the longer cog and the groove coincide when the cog wheels engage, thereby enabling alignment of the eccentric elements.

The mechanism comprises a transmission shaft having an axis aligned with the upper articulations of the connecting suspension rods.

A first distance is defined between the distal end of each eccentric element and the corresponding rotation axis. A second distance is defined equal to the centre-to-centre distance of the connecting suspension rods. The first distance is less than the second distance, in order for the eccentric elements to pass under the transmission shaft.

The mechanism comprises start-up means, including for example a chain or a gearing system, designed to drive one of the cog wheels into rotation.

The start-up means comprise a motor.

The start-up means comprise a crank.

The mechanism is void of dedicated start-up means of the mechanism or mechanisms. In this case, the start-up of the mechanism or mechanisms is doable by a simple push on the pendulum or pendulums or on one of the eccentric elements.

The mechanism comprises energy-collection means when in operation, for example in the form of a generator or of a motor-generator.

When the means of energy-collection comprise a generator, the machine preferably comprises means for starting up the mechanism, including a motor or a crank. This enables to overcome the resistance at start-up linked to the presence of the generator.

In order to fix the connecting link rod, the first shaft supports one of the cog wheels, whereas the second shaft is fixed onto the base.

In order to fix the connecting link rod, the first shaft is fixed onto the base, whereas the second shaft supports one of the cog wheels.

The axis of the cog wheels are horizontal.

The reference plane is horizontal.

The reference plane is vertical.

The invention also concerns a rotating machine, comprising at least one mechanism such as mentioned above.

The rotating machine is preferably an energy-production or transformation machine, presenting improved yield. Advantageously, said machine is void of a crankshaft.

As non-exhaustive examples, the rotating machine can be a motor, a generator, a mixer, a centrifuge, a compressor, a pump or a turbine.

When the machine is an internal combustion motor, the eccentric elements equipping the mechanism join up in two maximal centrifugation positions, each one corresponding to a combustion of gas inside the motor.

According to an advantageous embodiment, the machine comprises at least one pair of mechanisms placed in series and synchronised. The mechanisms are aligned and mobile in opposing phases.

Each mechanism comprises its own transmission shaft, having an axis aligned with the upper articulations of the connecting suspension rods.

According to another advantageous embodiment, the machine comprises several pairs of mechanisms placed in series and synchronised within each pair. The pairs are placed in parallel and synchronised among themselves.

The machine comprises two transmission shafts, each one coupled with different mechanisms placed in parallel within a row.

Advantageously, the machine comprises a single energy-collection shaft.

According to another advantageous embodiment, the machine is a two-stroke motor comprising two mechanisms. The first two eccentric elements are placed at half-turn intervals, and the second two eccentric elements are placed at half-turn intervals.

According to another advantageous embodiment, the machine is a four-stroke motor comprising four mechanisms. The first four eccentric elements are placed at quarter-turn intervals, and likewise the second four eccentric elements are placed at quarter-turn intervals.

Preferably, when the machine comprises several pendulum mechanisms, the base is common to all the pendulums. In other words, all the pendulums are suspended on the same base.

The object of the invention also concerns an implementation method of a mechanism such as described above, comprising the following successive steps:
- a positioning step of the eccentric elements one in relation to the other and in relation to the cog wheels, in order that the moments of gravity force of the eccentric elements have a same value and a same direction, both being variable depending on their angular position around the axis, and that for each angular position of the cog wheels and of the eccentric elements around the axis, the mechanism presents an equilibrium configuration at rest;
- a rotation start-up step of the cog wheels and of the eccentric elements around the axis, wherein the mechanism quits the equilibrium configuration and sets into motion; and
- an operating step, wherein the rotation of the eccentric elements around the axis generates centrifugal force within the mechanism, the eccentric elements following an elliptical movement, whereas the pendulum follows a travel movement having a vertical component and a horizontal component.

The invention will be better understood upon reading the following description, given solely as a non-exhaustive example making reference to the sketches attached hereto, wherein:

FIGS. 5 to 12 show sketches of the mechanism in FIGS. 1 and 2, illustrating the movements of the cog wheels and of the eccentric elements;

FIGS. 13 to 16 show sketches analogous to FIGS. 5 to 8 for a mechanism according to a second embodiment of the invention;

FIGS. 1 to 12 show an energy-saving equilibrium mechanism 1, according to a first embodiment of the invention.

Figure 1:
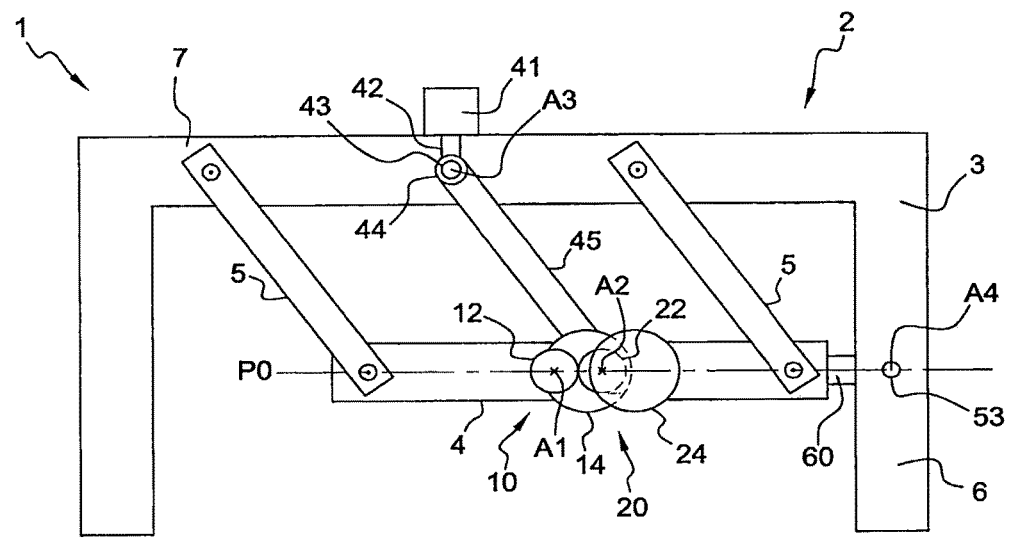
FIG. 1 is a side view of a mechanism according to a first embodiment of the invention, comprising a support with pendulum, two cog wheels, two eccentric elements and one connecting link rod.

The mechanism 1 comprises a support 2, a first unit 10 mobile in rotation R1 around a first axis A1, a second unit 20 mobile in rotation R2 around a second axis A2, a start-up means 40 of the mechanism 1, a support shaft 53, and a connecting link rod 60. The axis A1 and A2 are horizontally parallel to each other and placed within a reference plane P0 which is horizontal. The units 10 and 20 are contra-rotating.

The support 2 includes a fixed base 3 and a mobile pendulum 4, which is positioned horizontally and suspended on the base 3 by four connecting rods 5. Each connecting rod 5 is articulated both on the base 3 and on the pendulum 4, via axis pivot links parallel to the axis A1 and A2. The pendulum 4 is mobile in circular translation in relation to the base 3, on a restricted travel path. The connecting rods 5 are articulated within the angles of the pendulum 4. The connecting rods 5 are slanting in accordance with an angle of 45 degrees in relation to a vertical plane.

The base 3 comprises two vertical supports 6 and an upper horizontal upright 7. The connecting rods 5 are articulated on the upright 7. Alternatively, the base 3 can comprise two uprights 7. Additionally, the base 3 can comprise one or several lower horizontal uprights 7.

The pendulum 4 comprises three longitudinal plates 8 and transversal bars 9 fixed to the tips of the longitudinal plates 8. The connecting rods 5 are articulated on the external plates 8. The plates 8 of the pendulum 4 support the units 10 and 20. More precisely, the unit 10 is supported by the intermediary plate 8 and the front plate 8 via the bearings 15, the unit 20 is supported by the intermediary plate 8 and the rear plate 8 via the bearings 25. The axis A1 and A2 are fixed in relation to the pendulum 4.

The unit 10 comprises a shaft 11, a cog wheel 12 equipped with cogs 13, a cylinder 14 and bearings 15. The shaft 11, the wheel 12 and the bearings 15 are centred on the axis A1, whereas the cylinder 14 constitutes an eccentric element, having a centre of gravity G1 off-centred by a distance d1 in relation to the axis A1. The wheel 12 and the cylinder 14 are mounted on a shaft 11, which is supported by the bearings 15 mounted inside the plates 8 of the pendulum 4. The wheel 12 is mobile in rotation R1 in relation to the pendulum 4 around the axis A1.

The cylinder 14 is integral in rotation R1 with the wheel 12 and generates a moment M1 of gravity force P1 around the axis A1. The force P1 is relatively constant. However, the moment M1 has a value and a direction (clockwise or anticlockwise) which are variable depending on the angular position of the cylinder 14 around the axis A1.

The unit 20 comprises a shaft 21, a cog wheel 22 equipped with cogs 23, a cylinder 24 and bearings 25. The shaft 21, the wheel 22 and the bearings 25 are centred on the axis A2, whereas the cylinder 24 constitutes an eccentric element, having a centre of gravity G2 off-centred by a distance d2 in relation to the axis A2. The wheel 22 and the cylinder 24 are mounted on a shaft 21, which is supported by the bearings 25 mounted inside the plates 8 of the pendulum 4. The wheel 22 is mobile in rotation R2 in relation to the pendulum 4 around the axis A2.

The cylinder 24 is integral in rotation R2 with the wheel 22 and generates a moment M2 of gravity force P2 around the axis A2. The force P2 is basically constant. However, the moment M2 has a value and a direction (clockwise or anticlockwise) which are variable depending on the angular position of the cylinder 24 around the axis A2.

The wheels 12 and 22 engage one with the other using a unitary transmission ratio. The wheels 12 and 22 have the same dimensions and the same number of cogs 13 and 23. The wheels 12 and 22 are mobile in rotation R1 and R2 in opposing directions. In other words, the wheels 12 and 22 are contra-rotating.

Figure 3:
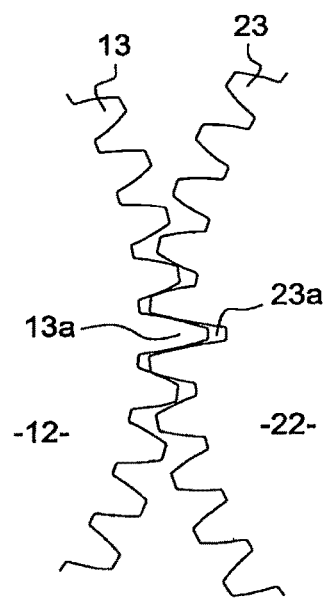
FIG. 3 is a partial detailed view of the engagement between the two cog wheels of the mechanism.

As illustrated in FIG. 3, the wheel 12 has a cog 13a longer than the other cogs 13, whereas the wheel 22 has a groove 23a formed between two cogs 23. The cog 13a and the groove 23a can present different shapes without departing from the scope of the invention.

In practice, the cog 13a and the groove 23a coincide at the time of engagement of the cog wheels 12 and 22, which enables the alignment of the cylinders 14 and 24, and thus the precise balancing of the mechanism 1.

For example, the cog wheels 12 and 22 and the cylinders 14 and 24 can be equipped with fixing holes placed opposite each other, not represented in the different figures for simplification reasons. Hence, the cog 13a and the groove 23a facilitate the alignment of said fixing holes.

In the context of the invention, the cylinders 14 and 24 are positioned with precision one in relation to the other and in relation to the wheels 12 and 14, in order that the moments M1 and M2 always have the same value and the same direction (clockwise or anticlockwise), regardless of the respective angular positions of the cylinders 14 and 24 around the axis A1 and A2.

The mass and the dimensions of the cylinders 14 and 24 are determined with precision, since they influence the position of the centres of gravity G1 and G2, and thus the value of the moments M1 and M2. The mass of each cylinder 14 and 24 is proportional to its dimensions, with constant volume mass. Preferably, the cylinders 14 and 24 have the same mass and the same dimensions. Alternatively, the cylinders 14 and 24 can have different masses and dimensions, as long as the moments M1 and M2 have the same value and the same direction (clockwise or anticlockwise) regardless of their respective angular positions.

The start-up device 40 of the mechanism 1 is designed to initiate the rotation R1 and R2 of the units 10 and 20, as from a state of equilibrium of the mechanism 1. The device 40 can present any configuration adapted to the application in question.

Figure 2:
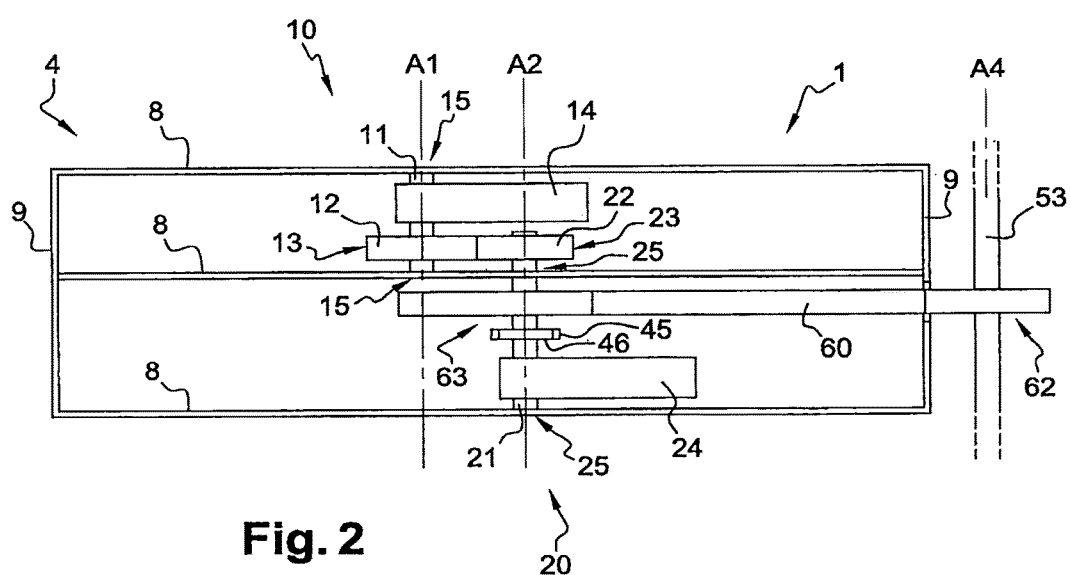
FIG. 2 is a partial top view, on a larger scale, of the pendulum equipping the mechanism in FIG. 1.

In the example in FIGS. 1 and 2, the device 40 comprises a motor 41, a belt 42, a transmission shaft 43, a cog wheel 44, a notched chain 45 and a cog wheel 46. The motor 41 is placed on the upright 7 of the base 3. The shaft 43 is supported at its tips by a base 3 and mobile in rotation around an axis A3, which is aligned vertically with the upper articulations of the connecting rods 5. The axis A3 is placed horizontally, parallel to the axis A1 and A2. The belt 42 links the motor 41 to the shaft 43. The wheel 44 is mounted integral in rotation with the shaft 43, whereas the wheel 46 is mounted integral in rotation with the shaft 21. Alternatively, the wheel 46 can be mounted integral in rotation with the shaft 11. The chain 45 links the wheels 44 and 46, the centre-to-centre distance of which being equal to the centre-to-centre distance of the connecting rods 5. According to another alternative, the cog wheels 44 and 46 as well as the chain 45 can be replaced by a system of universal joints, or any other movement transmission system adapted to the application in question. Hence, the start-up of the motor 41 enables to drive the units 10 and 20 in rotation R1 and R2.

Figure 4:
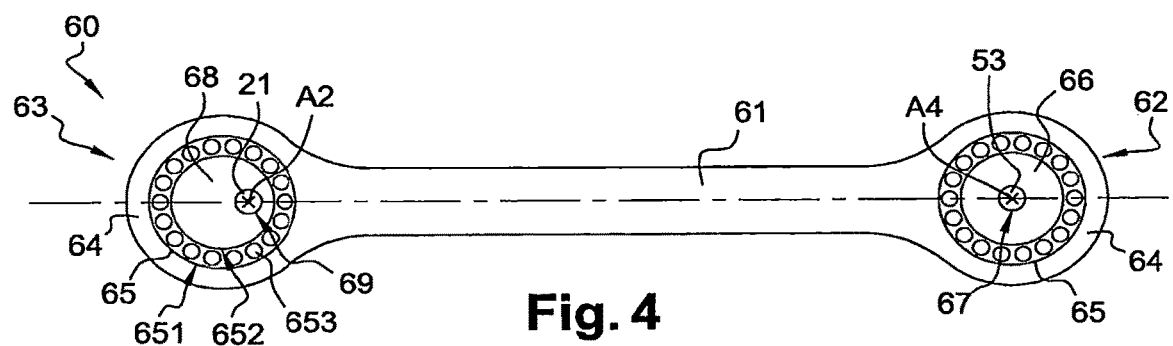
FIG. 4 is a side view of the connecting link rod equipping the machine in FIGS. 1 and 2.

As notably illustrated in FIG. 4, the connecting link rod 60 comprises a central body 61 linking two heads 62 and 63 and located at its longitudinal tips. The end 62 is mounted as a pivot link on a shaft 53 fixed on the base 3, on one of the supports 6. The end 63 is shaped eccentrically, and is mounted as an eccentric pivot link on shaft 21. Alternatively, according to a different configuration of the mechanism 1, the end 63 can be mounted as an eccentric pivot link on shaft 22.

The rotary head 62 and the eccentric head 63 each comprise an annular part 64 wherein is housed a ball bearing 65. Alternatively, said annular part 64 can comprise any type of bearing adapted to the application in question. Each ball bearing 65 comprises an outer ring 651, an inner ring 652 and a row of balls 653.

The rotary head 62 comprises an annular sleeve 66, comprising an opening 67. for receiving the shaft 53. The sleeve 66 is integral with the shaft 53 and mobile in rotation inside the ball bearing 64.

The eccentric head 63 comprises an eccentric sleeve 68, comprising an opening 69 for receiving the shaft 21. The sleeve 68 is integral with the shaft 21 and mobile in rotation inside the ball bearing 64.

Alternatively, the connecting rod 60 can be shaped differently without departing from the scope of the invention.

The connecting rod 60 absorbs the thrust and traction forces generated by the pendulum 4 during the course of the operating of the mechanism 1. Moreover, the connecting rod 60 rigidifies the mechanism 1 and enables a significant reduction in vibration.

In practice, the movement of the mechanism 1 enables to collect the energy in the region of the shaft 43, for example by coupling said shaft 43 with a generator. Alternatively, the motor 41 can be configured like a motor-generator, designed to supply energy at the start-up of the mechanism 1, then collecting the energy when the mechanism 1 is operating, the shaft 43 thus constituting an energy-collecting shaft.

As a non-represented variant, the mechanism 1 can be void of any motor 41 and belt 42 device constituting start-up means. In this case, the start-up of the mechanism 1 can be embodied by simply pressing on one side of the pendulum 4 or on one of the cylinders 14 and 24. The energy necessary for launching the mechanism 1 is quite insignificant. Preferably, the mechanism 1 comprises all the same the elements 43, 44, 45 and 46.

In order to enable the correct operating of the mechanism 1, the distance between the distal tip of each cylinder 14 and 24 and its rotation axis A1 or A2 is less than the centre-to-centre distance between the articulations of the connecting rods 5, so that the cylinders 14 and 24 are able to pass under the transmission shaft 43.

FIGS. 5 to 12 illustrate the operating of the mechanism 1 over a single turn. In particular, FIGS. 5 to 8 illustrate a half-turn during which the cylinders 14 and 24 are mobile on the right-hand side of the pendulum 4, whereas FIGS. 9 to 12 illustrate a half-turn during which the cylinders 14 and 24 are mobile on the left-hand side of the pendulum 4.

FIG. 5 illustrates the cylinder 14 positioned upwards and the cylinder 24 positioned downwards. The mechanism 1 is in equilibrium. The wheels 12 and 22 are stationary. The moments M1 and M2 are non-existent.

At this stage, the device 40 enables to start-up the movement of the mechanism 1, with engagement of the wheels 12 and 22, in order for the cylinders 14 and 24 to be both shifted to the right. The tipping of the cylinder 14 helps the wheel 12 to turn in the direction of rotation R1, which enables to drive the wheel 22 in the direction of rotation R2, and thus to lift up cylinder 24.

FIG. 6 illustrates the cylinders 14 and 24, each one having made one-eighth of a turn on the right-hand side. FIG. 7 illustrates the cylinders 14 and 24, each one having made a quarter turn on the right-hand side. FIG. 8 illustrates the cylinders 14 and 24, each one having made a three-quarter turn on the right-hand side. At each moment, the moments M1 and M2 have the same value and the same direction (clockwise). Through the action of the cylinders 14 and 24, the pendulum 4 is driven upwards from the right. A thrust force is then transmitted by the connecting rod 60 to the shaft 53.

Figure 9:
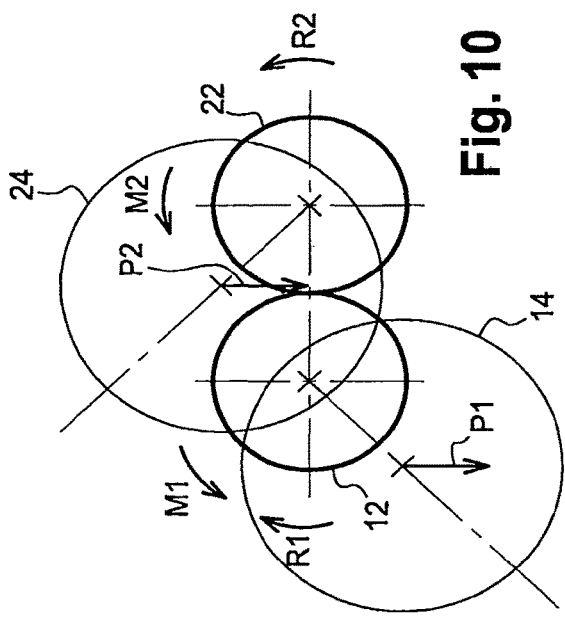

FIG. 9 illustrates the cylinders 14 and 24, each one having made a half turn in relation to their initial position in FIG. 5. The cylinder 14 is positioned downwards, whereas the cylinder 24 is positioned upwards. The moments M1 and M2 are non-existent. The wheels 12 and 22 are in motion, in order for the cylinders 14 and 24 to be both shifted to the right. The tipping of the cylinder 24 helps the wheel 22 to turn in the direction of rotation R2, which enables to help wheel 22 to turn in the direction of rotation R1, and thus to lift up the cylinder 14.

Figure 10:
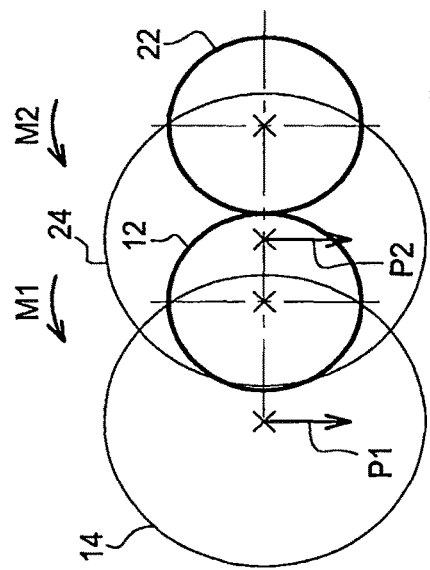
Figure 11:
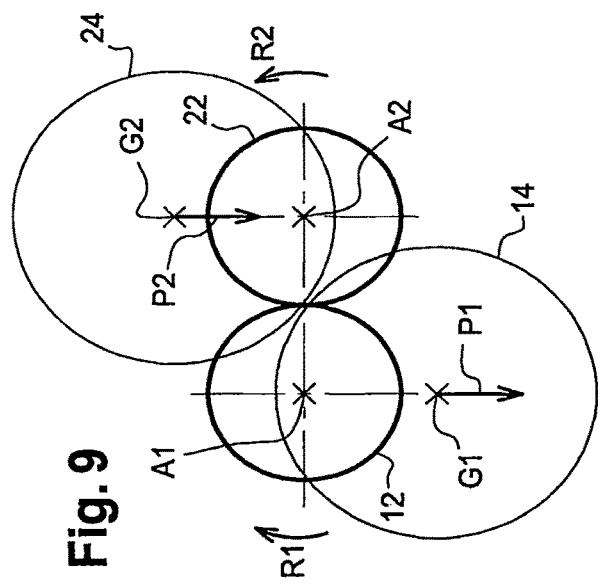
Figure 12:
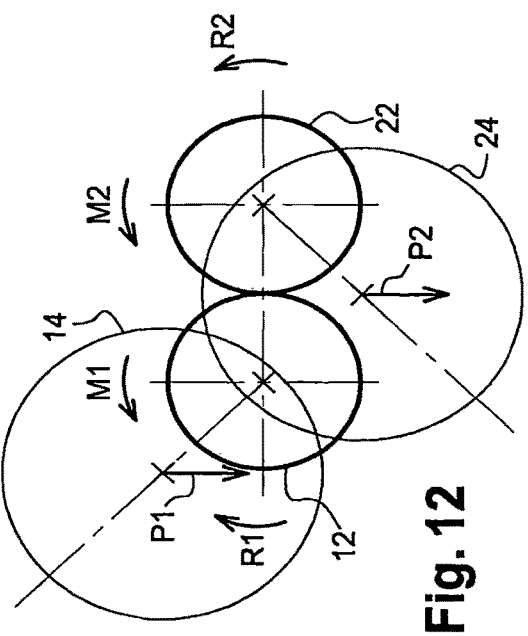

FIG. 10 illustrates the cylinders 14 and 24, each one having made one-eighth of a turn on the left-hand side. FIG. 11 illustrates the cylinders 14 and 24, each one having made a quarter turn on the left-hand side. FIG. 12 illustrates the cylinders 14 and 24, each one having made a three-quarter turn on the left-hand side. At each moment, the moments M1 and M2 have the same value and the same direction (anticlockwise). Under the action of the cylinders 14 and 24, the pendulum 4 is driven downwards from the left. A traction force is then transmitted by the connecting rod 60 to the shaft 53.

As the units 10 and 20 pivot around the axis A1 and A2, the cylinders 14 and 24 are thus situated sometimes on the right, sometimes on the left. In practice, the rotation R1 and R2 of the cylinders 14 and 24 generate centrifugal forces within the mechanism 1. The pendulum 4 shifts sometimes upwards to the right, sometimes downwards to the left, while being suspended on the base 3 by the connecting rods 5 slanting at 45 degrees. The pendulum 4 describes a travel movement having a vertical component and a horizontal component. By consequence, the cylinders 14 and 24 follow an elliptical movement instead of a circular movement.

The mechanism 1 follows a two-phase oscillatory movement. The centrifugal forces are maximal when the cylinders 14 and 24 pass each other, in FIGS. 7 and 11. Each phase corresponds to a half turn (180°) by the cylinders 14 and 24, in between their maximal centrifugation positions.

The slanting of the connecting rods 5 enables to modify the centre of gravity of the mechanism 1, in comparison with the connecting rods 5 which would be placed vertically to the equilibrium. The thrust or traction energy of the pendulum 4 is significantly higher than the initial driving force in rotation of the cylinders 14 and 24. Once the mechanism 1 is in motion, the centrifugal energy generated by the cylinders 14 and 24 is significantly higher than the thrust or traction energy of the pendulum 4.

Considering the explanations above, it is remarkable that for each angular position of the cog wheels 12 and 22 and of the cylinders 14 and 24 around the axis A1 and A2, the mechanism 1 presents an equilibrium configuration at rest. In other words, when considering the mechanism 1 at a standstill, regardless of the angular position of the units 10 and 20, the mechanism 1 then finds itself in a rest configuration. The mechanism 1 is balanced, which considerably reduces the energy necessary to make the units 10 and 20 turn.

Other embodiments of the invention are illustrated in FIGS. 13 to 24. Certain elements constituting mechanism 1 are comparable to those of the first embodiment described earlier and, for simplification reasons, bear the same reference numbers.

FIGS. 13 to 16 illustrate the operating of the mechanism 1 according to a second embodiment. The axis A1 and A2 are parallel to each other and horizontal. Having said that, the axis A1 and A2 are placed within a reference plane P0 which is vertical. The eccentric elements 14 and 24 are constituted by elongated arms and not by cylinders.

Also in this embodiment, the arms 14 and 24 are positioned with precision one in relation to the other and in relation to the wheels 12 and 22, in order that the moments M1 and M2 always have the same value and the same direction (clockwise or anticlockwise), regardless of the respective angular positions of the arms 14 and 24 around the axis A1 and A2.

Only the position of the arms 14 and 24 on the right-hand side is illustrated in FIGS. 13 to 16, whereas the position of the arms 14 and 24 of the left-hand side is not illustrated, for simplification reasons.

Figure 17:
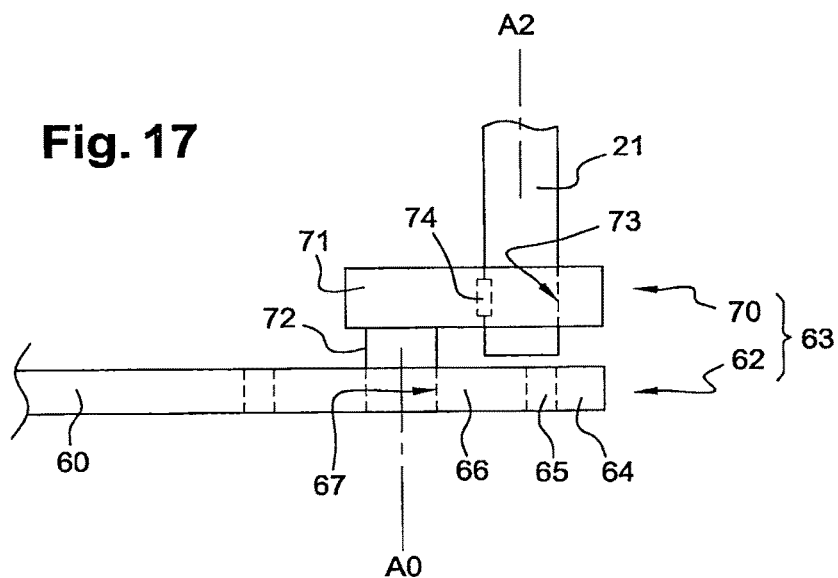
FIG. 17 is a top view showing a variant for linking the connecting link rod onto the mechanism.

FIG. 17 illustrates a linking variant of the connecting link rod 60 with the shaft 21. The eccentric head 63 is constituted of a traditional rotary head 62 and an eccentric part 70 interposed between the shaft 21 and the head 62.

The part 70 comprises an elongated body 71 and a cylindrical clankpin 72 integral with the body 71. An opening 73 is formed in the body 71. The shaft 21 is placed inside the opening 73 and attached to the body 71, for example using a cotter pin 74 or via any other means. The shaft 21 and the opening 73 are centred on the axis A2. The clankpin 72 is placed inside the opening 67 of the sleeve 66, centred on an axis A0. Said axis A0 constitutes the rotation axis of the axis A2 during the movement of the mechanism 1.

Figure 18:
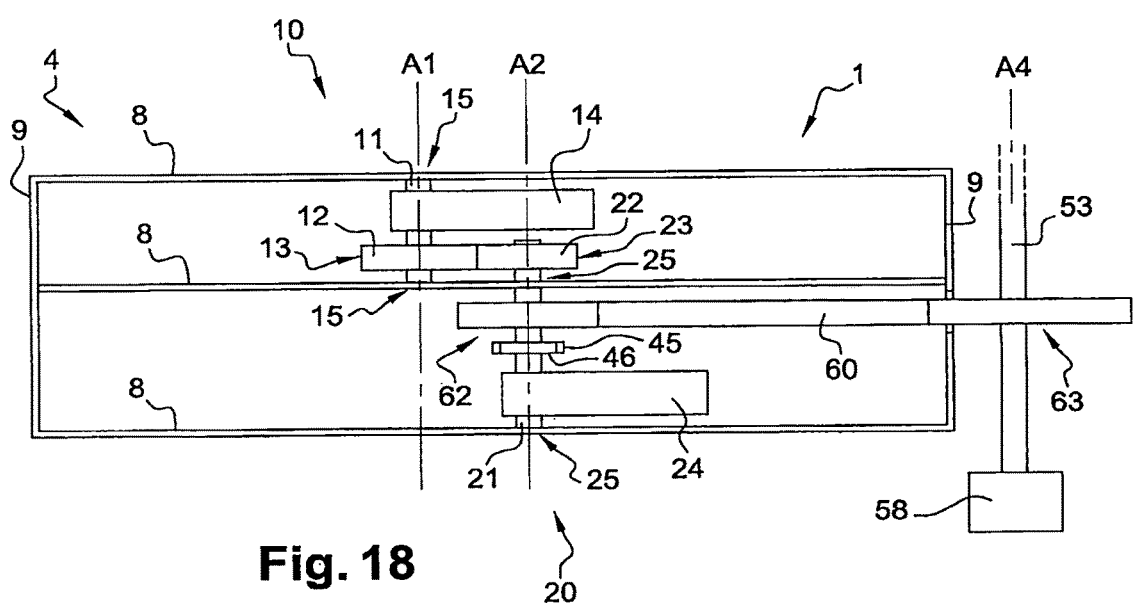
FIG. 18 is an analogous view to FIG. 2, for a mechanism according to a third embodiment of the invention.

FIG. 18 illustrates the operating of a mechanism 1 according to a third embodiment.

The rotary head 62 of the connecting rod 60 is mounted as a pivot link on the shaft 21, whereas the eccentric head 63 is mounted as an eccentric pivot link on the shaft 53 fixed onto the base 3. Alternatively, according to a different configuration of the mechanism 1, the head 62 can be mounted as a pivot link on the shaft 22.

In this embodiment, the movement of the mechanism 1 enables to collect the energy in the region of the shaft 53, for example by coupling said shaft 53 with a generator 58. The shaft 53 thus constitutes an energy-collection shaft.

In practice, a single mechanism 1 enables to constitute a motor. Nevertheless, it is preferable to manufacture a motor by associating several mechanisms 1 synchronised, as explained in detail hereafter.

Figure 19:
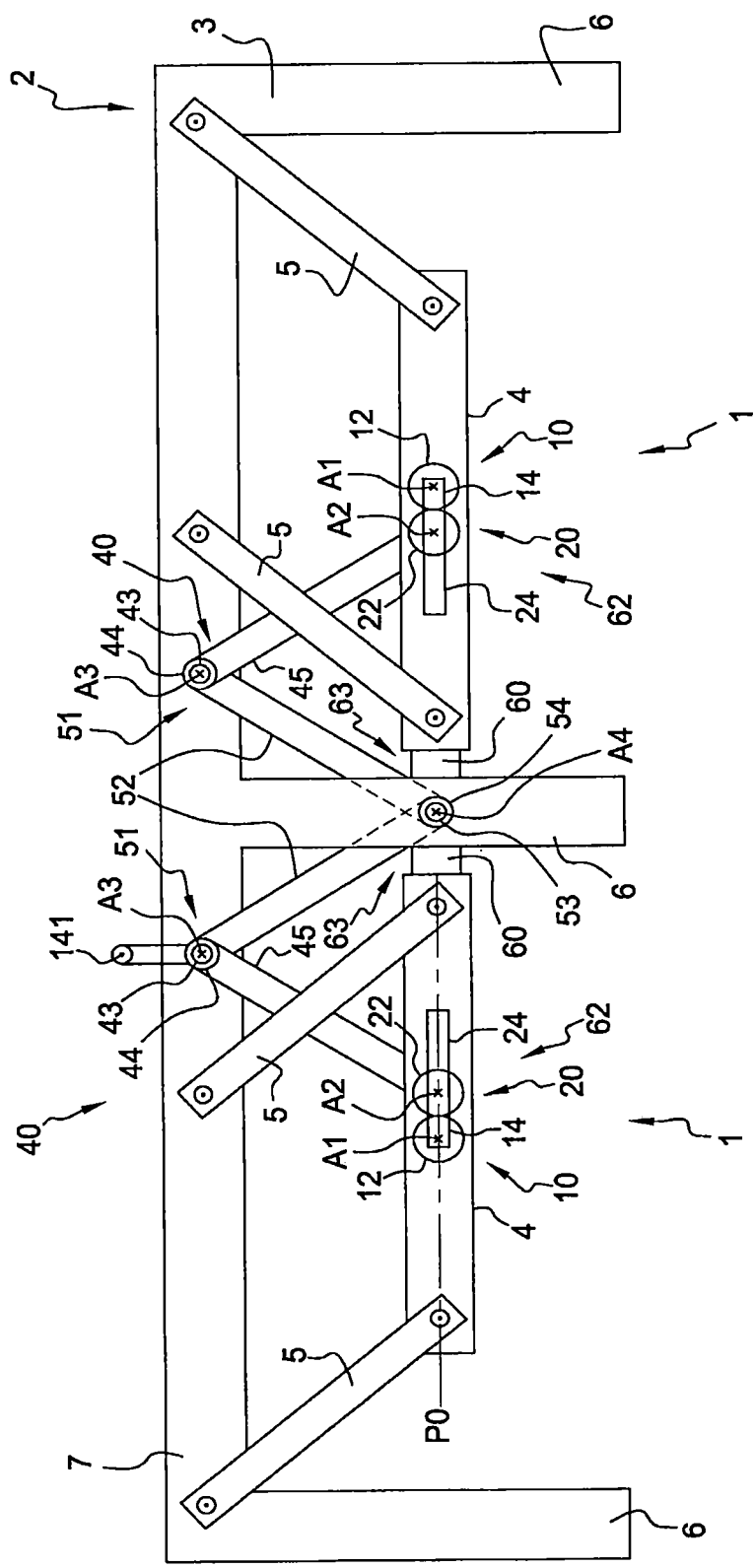
FIG. 19 is an analogous view to FIG. 1, illustrating a machine example according to the invention, equipped with two serial mechanisms.
Figure 20:
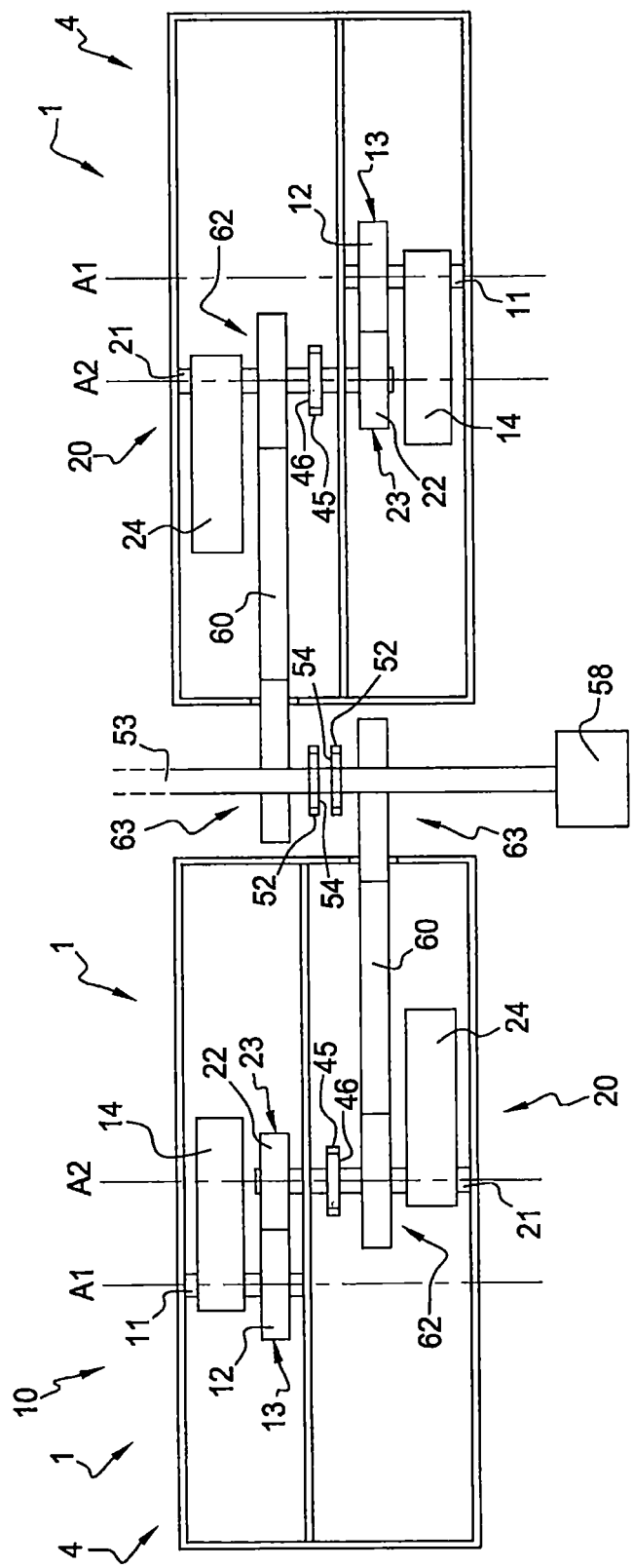
FIG. 20 is a top view of the machine of FIG. 1.

FIGS. 19 and 20 illustrate a rotating machine example according to the invention, of the two-stroke motor type. The motor comprises two mechanisms 1, each one equipped with its own pendulum 4. The mechanisms 1 are placed in series, i.e. aligned in the prolongation of each other, in the direction of movement of the pendulums 4.

The base 3 is common to both mechanisms 1. In other words, the base 3 supports each of the pendulums 4 suspended in series. The base 3 comprises four lateral supports 6 and two central supports 6. The connecting suspension rods 5 are slanting at 45 degrees, in order for the pendulums 4 to be brought closer to the central supports 6. The eccentric elements 14 and 24 are elongated arms.

Each mechanism 1 comprises its own transmission shaft 43, having an axis A3 aligned with the upper articulations of the connecting rods 5. However, only one crank 141 is necessary for the start-up of the mechanisms 1. Alternatively, the crank 141 can be replaced by a motor 41, or the machine can be void of means for starting up the mechanisms 1.

The machine comprises an intermediary device 50 in between the devices 40 of the two mechanisms 1. Said device 50 can be used for the transmission of movement between the two devices 40, as well as for the collection of energy.

In the example of FIGS. 19 and 20, the device 50 comprises two cog wheels 51, two notched chains 52, one shaft 53 and two cog wheels 54. The shaft 53 is supported at its tips by the base 3, more precisely by the two central supports 6 of the base 3. The shaft 53 is mobile in rotation around an axis A4, which is placed horizontally, parallel to the axis A1, A2 and A3. The wheels 51 are mounted integral in rotation with the shafts 43 of the two mechanisms, whereas the wheels 54 are mounted integral in rotation with the shaft 53. The chains 52 link the wheels 51 and the wheels 54.

Each mechanism 1 comprises a connecting link rod 60 having a rotary head 62 mounted on the shaft 21 and an eccentric head 63 mounted on the shaft 53.

When the machine is in operation, the two mechanisms 1 work in opposition. Simultaneously, the pendulums 4 exercise sometimes a thrust force, sometimes a traction force, on the shaft 53.

The movement of the mechanisms 1 enables to collect the energy in the region of the shaft 53, for example by coupling said shaft 53 with a generator 58. The shaft 53 then constitutes an energy-collection shaft.

The slanting of the connecting rods 5 enables to modify the centre of gravity of the mechanisms 1, in comparison with the connecting rods 5 that would be placed vertically to the equilibrium. The thrust or traction energy of the pendulums 4 is significantly higher than the initial driving force in rotation of the eccentric elements 14 and 24. Once the mechanisms 1 are in motion, the centrifugal energy generated by the eccentric elements 14 and 24 is significantly higher than the thrust or traction energy of the pendulums 4.

Figure 21:
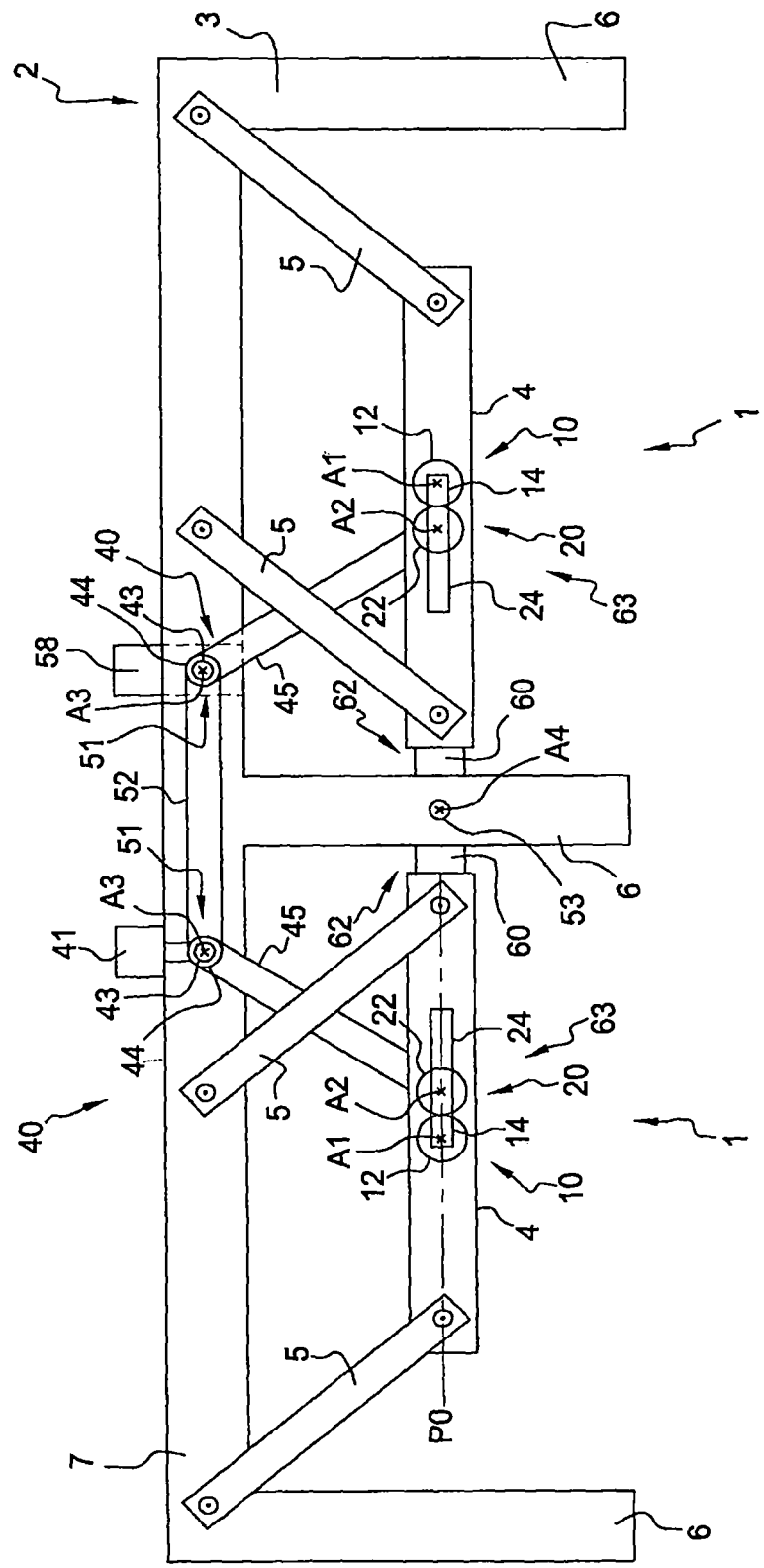
FIG. 21 is an analogous view to FIG. 18, illustrating a second example of the machine according to the invention.

FIG. 21 illustrates a second machine example according to the invention, corresponding to a variant of the FIGS. 19 and 20.

The device 50 comprises two cog wheels 51 and a notched chain 52. The wheels 51 are mounted integral in rotation with the shafts 43, whereas the chains 52 link the wheels 51 of the two mechanisms 1.

The shaft 53 is fixed to the central supports 6 and does not belong to the device 50.

Each mechanism 1 comprises a connecting link rod 60 having a rotary head 62 mounted on the shaft 53 and an eccentric head 63 mounted on the shaft 21.

The movement of the mechanisms 1 enables to collect the energy in the region of the shafts 43. In the example in FIG. 21, the shaft 43 of the right-hand mechanism 1 is coupled with a generator 58. Alternatively, the motor 41 can be configured like a motor-generator, designed to supply the energy at machine start-up, then collecting the energy when the mechanism 1 is in operation.

Figure 22:
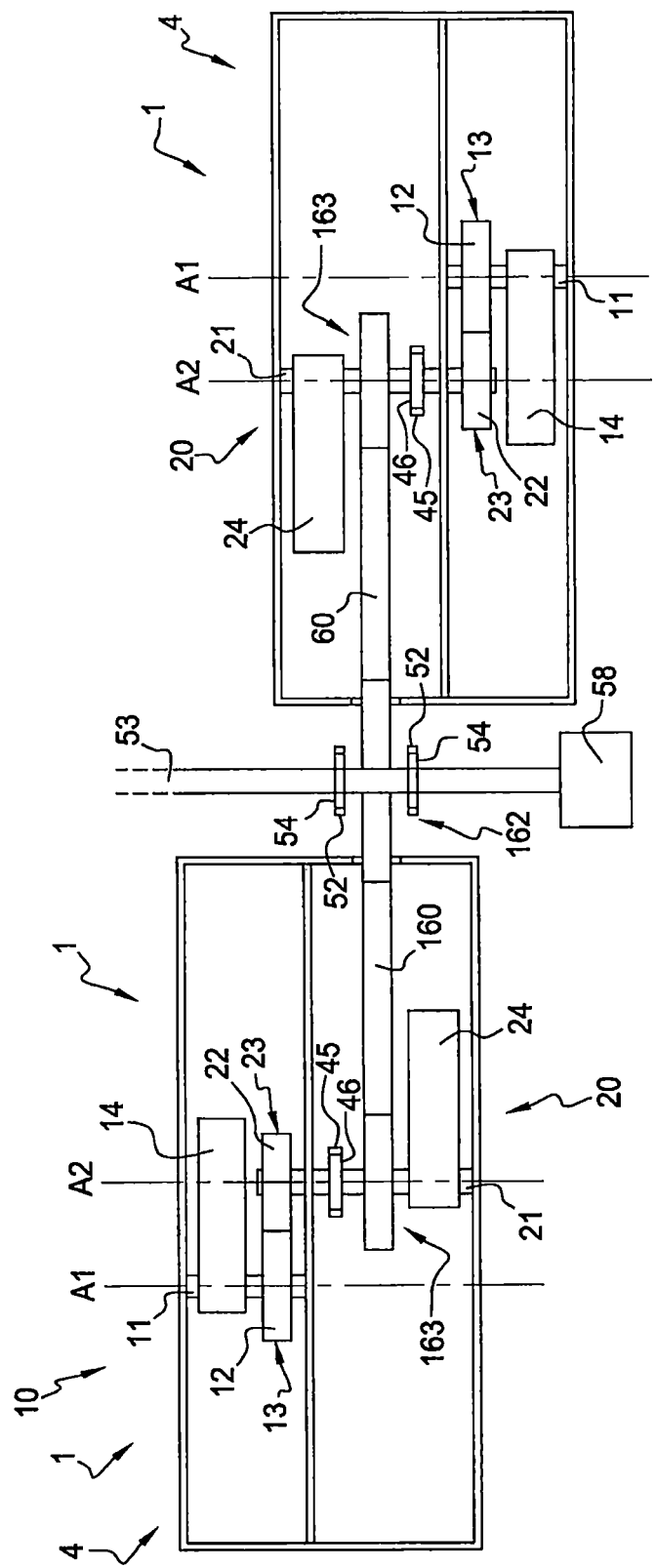
FIG. 22 is an analogous view to FIG. 19, illustrating a third example of the machine according to the invention.

FIG. 22 illustrates a third machine example according to the invention, also corresponding to a variant of the FIGS. 19 and 20.

Said machine comprises a connecting link rod 160 common to both mechanisms 1. Said connecting rod 160 comprises a central rotating head 62 mounted as a pivot link on the shaft 53, and two eccentric tip heads 63 mounted as an eccentric pivot link on the shafts 21 of both mechanisms 1.

Figure 23:
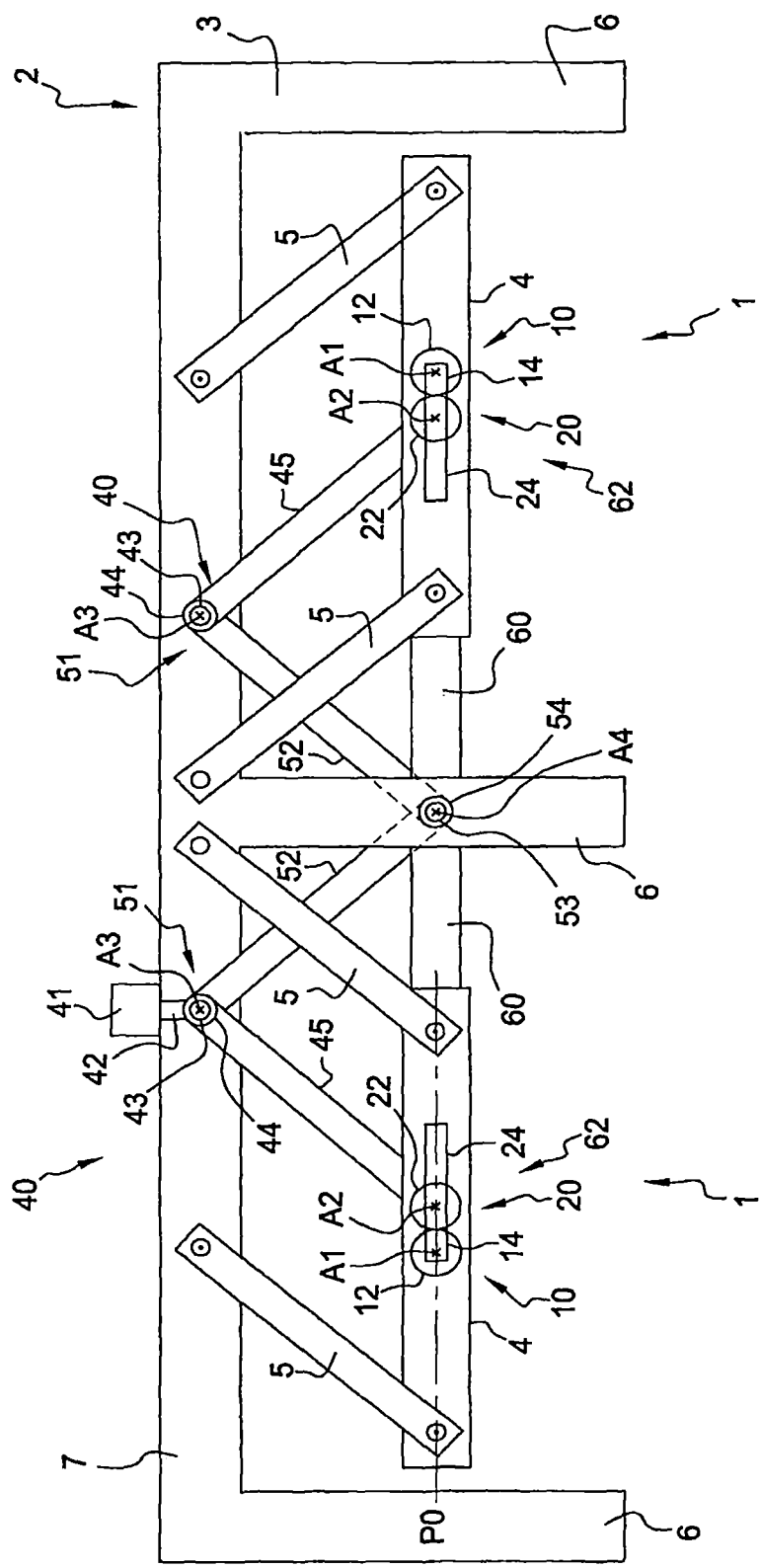
FIG. 23 is an analogous view to FIG. 18, illustrating a fourth example of the machine according to the invention.

FIG. 23 illustrates a fourth machine example according to the invention, also corresponding to a variant of the FIGS. 19 and 20.

The connecting suspension rods 5 are slanting at 45 degrees, in order for the pendulums 4 to be moved away from the central supports 6. By consequence, the chains 45 and 52, as well as the connecting rods 60, are made longer. The shaft 53 constitutes an energy-collection shaft.

Figure 24:
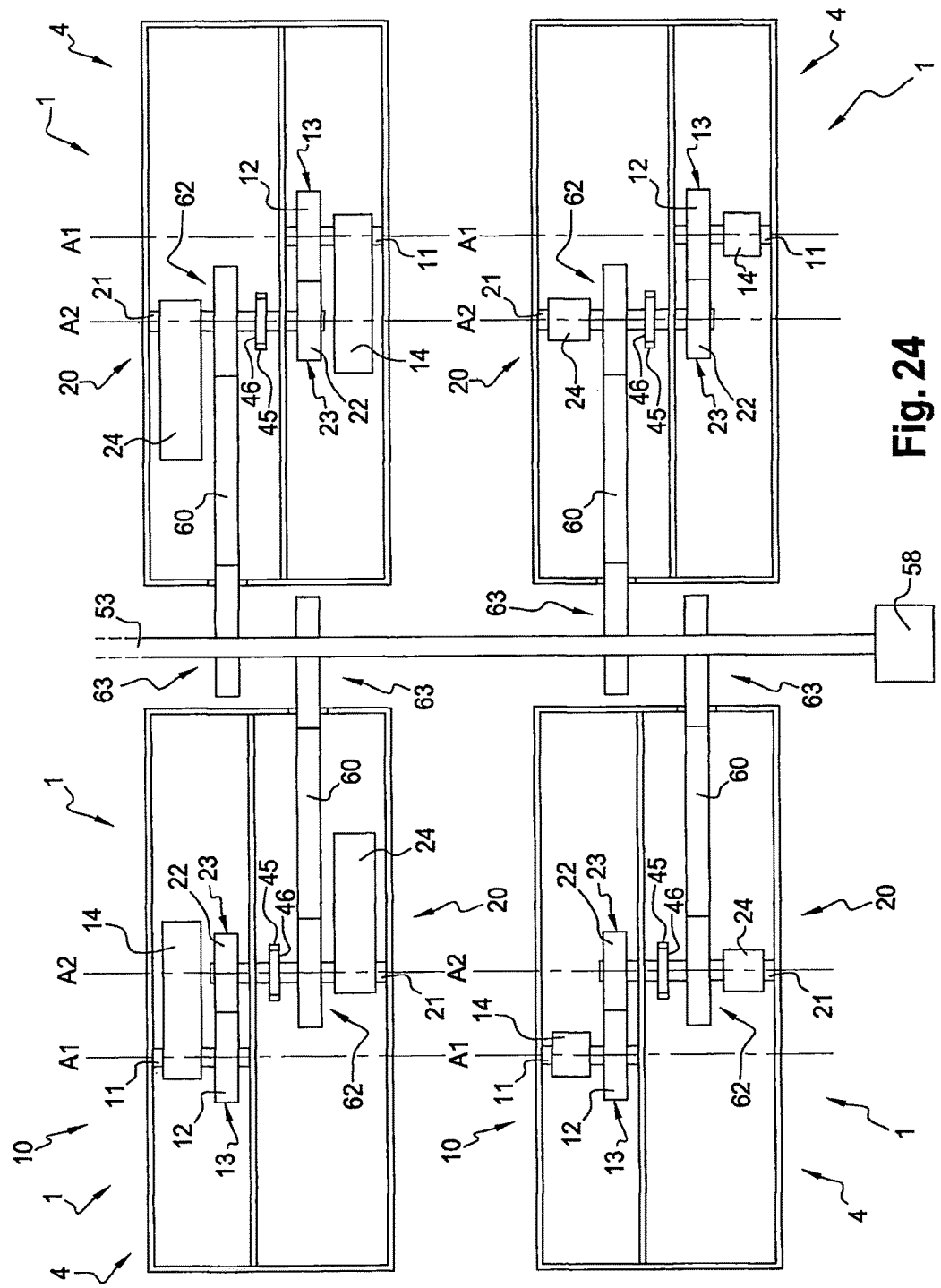
FIG. 24 is an analogous view to FIG. 19, illustrating a fifth example of the machine according to the invention, equipped in parallel with two pairs of mechanisms in series.

FIG. 24 illustrates a fifth rotating machine example according to the invention, of the four-stroke motor type. The motor comprises four mechanisms 1 according to the invention, each one equipped with its own pendulum 4.

The motor comprises two pairs of mechanisms 1. Within each pair, the mechanisms 1 are placed in series and synchronised. The pairs are placed in parallel and synchronised with each other.

The base 3, not represented for simplification reasons, is common to all the mechanisms 1.

The motor comprises two transmission shafts, not represented for simplification reasons. One transmission shaft is coupled with the mechanisms placed in parallel on the left-hand side, and the other transmission shaft is coupled to the mechanisms placed in parallel on the right-hand side.

Advantageously, the machine comprises a single energy-collection shaft 53.

In practice, the four arms 14 are offset by a quarter turn one in relation to another. Likewise, the four arms 24 are offset by a quarter turn one in relation to another. Hence, the motor always has the same number of arms 14 or 24 on the left-hand side or the right-hand side, thereby improving its yield. Each phase corresponds to a quarter turn (90°) of the mechanisms 1.

When two mechanisms 1 present non-existent moments M1 and M2, the other two mechanisms 1 are in maximal centrifugation positions, respectively on the left-hand side and on the right-hand side. The energy generated is maximal in said maximal centrifugation positions. As the four mechanisms 1 never present non-existent moments M1 and M2 at the same time, the motor has no neutral phase. Advantageously, each maximal centrifugation position corresponds to a gas combustion inside the motor.

According to a non-represented variant, the rotating machine comprises eight mechanisms 1, allocated according to four pairs of mechanisms 1 in series, the pairs being placed in parallel. During a turn, the machine produces a thrust every eighth of a turn (45°) of the mechanisms 1.

Other variants can be implemented without departing from the scope of the invention. The dimensions of the constitutive elements of the machine, for example the base 3 and the transmission shaft 43, vary according to the number of mechanisms 1.

In order to obtain the best results and yield, it is important that each pendulum 4 is positioned within a rigorously horizontal plane. The same applies for the axis A1 and A2 of the cog wheels 12 and 22, which must be situated in a rigorously horizontal or vertical plane P0, depending on the configuration of the mechanism 1.

In FIGS. 1 to 24, certain movements and distances are exaggerated for simplification reasons.

In practice, the mechanism 1 and the machine can be conformed differently from FIGS. 1 to 24 without departing from the scope of the invention.

For example, the transmission system by chains and cog wheels can be replaced by a system of universal joints, or any other movement transmission system adapted to the application in question.

In addition, the technical characteristics of the different embodiments and variants mentioned above can, in totality or for certain among them, be combined together. Hence, the mechanism 1 and the machine can be adapted in terms of cost, of functionalities and of performance.

The invention claimed is:

1. A mechanism (1), comprising:
a support (2) including a base (3), a pendulum (4) suspended on the base (3), and connecting suspension rods (5) articulated on the base (3) and on the pendulum (4);
a first cog wheel (12) mobile in rotation (R1) in relation to the support (2) around a first axis (A1);
a second cog wheel (22) mobile in rotation (R2) in relation to the support (2) around a second axis (A2);
a first eccentric element (14) integral with the first cog wheel (12) in rotation (R1) and generating a first moment (M1) of gravity force (P1) around the first axis (A1);
a second eccentric element (24) integral with the second cog wheel (22) in rotation (R2) and generating a second moment (M2) of gravity force (P2) around the second axis (A2); and
a connecting rod (60; 160) comprising a rotary head (62) mounted as a pivot link on a first shaft and an eccentric head (63) mounted as an eccentric pivot link on a second shaft;
wherein:
the first and second axes (A1; A2) are parallel within a horizontal or vertical reference plane (P0); and
the pendulum (4) supports the first and second axes (A1; A2) of the first and second cog wheels (12; 22) and of the first and second eccentric elements (14; 24);
the connecting suspension rods (5) are slanting in accordance with an angle comprised between 45 degrees and 80 degrees in relation to a vertical plane;
for the connecting link rod (60; 160), the first shaft is either a shaft (11; 21) supporting one of the first and second cog wheels (12; 22), or a shaft (53) fixed on the base (3), whereas the second shaft is the other shaft among the shaft (11; 21) supporting one of the first and second cog wheels (12; 22) and the shaft (53) fixed on the base (3);
the first and second cog wheels (12; 22) engage one with the other using a unitary transmission ratio and are mobile in rotation (R1; R2) in opposing directions;
when the mechanism (1) is in operation, the first and second eccentric elements (14; 24) follow an elliptical movement, whereas the pendulum (4) follows a travel movement having a vertical component and a horizontal component;
the first and second moments (M1; M2) of gravity force (P1; P2) of the first and second eccentric elements (14; 24) have a same value and a same direction, both being variable depending on angular position of the first and second eccentric elements (14; 24) around the first and second axes (A1; A2);
for each angular position of the first and second cog wheels (12; 22) and of the first and second eccentric elements (14; 24) around the first and second axes (A1; A2), the mechanism (1) presents an equilibrium configuration at rest.

2. The mechanism (1) according to claim 1, wherein the connecting suspension rods (5) are slanted according to an angle of 45 degrees in relation to a vertical plan.

3. The mechanism (1) according to claim 1, wherein the first and second eccentric elements (14; 24) have a same mass and same dimensions.

4. The mechanism (1) according to claim 1, wherein the first and second eccentric elements (14; 24) are of cylindrical shape.

5. The mechanism (1) according to claim 1, wherein the first and second cog wheels (12; 22) comprise a first wheel (12) having a cog (13*a*) longer than the other cogs (13) and a second wheel (22) having a groove (23*a*) formed between two cogs (23), and wherein the longer cog (13*a*) and the groove (23*a*) coincide when the first and second cog wheels (12; 22) engage, thereby enabling alignment of the first and second eccentric elements (14, 24).

6. The mechanism (1) according to claim 1, further comprising a transmission shaft (43) having an axis aligned with upper articulations of the connecting suspension rods (5).

7. The mechanism (1) according to claim 6, wherein a first distance is defined between a distal end of each of the first and second eccentric element (14; 24) and the corresponding one of the first and second axis (A1; A2), wherein a second distance equal to the centre-to-centre distance of the connecting suspension rods (5) linking the pendulum (4) to the base (3), and wherein the first distance is less than the second distance, in order for the first and second eccentric elements (14; 24) to pass under the transmission shaft (43).

8. The mechanism (1) according to claim 1, further comprising start-up means (40) designed to drive one of the first and second cog wheels (12; 22) into rotation (R1; R2).

9. The mechanism (1) according to claim 8, wherein the start-up means (40) comprise a motor (41).

10. The mechanism (1) according to claim 8, wherein the start-up means (40) comprise a crank (141).

11. The mechanism (1) according to claim 1, the mechanism being devoid of dedicated start-up means for the mechanism (1), and wherein the start-up of the mechanism (1) is doable by a push on the pendulum (4) or on one of the first and second eccentric elements (14; 24).

12. The mechanism (1) according to claim 1, further comprising energy-collection means (58; 41) in operation in the form of a generator (58) or of a motor-generator (41).

13. The mechanism (1) according to claim 1, wherein the first and second axes (A1; A2) of the first and second cog wheels (12; 22) are horizontal, and the reference plane (P0) is horizontal.

14. The mechanism (1) according to claim 1, wherein the first and second axes (A1; A2) of the first and second cog wheels (12; 22) are horizontal, and the reference plane (P0) is vertical.

15. A rotating machine, wherein the machine comprises at least one mechanism (1) according to claim 1.

16. The rotating machine according to claim 15, wherein the machine comprises at least one pair of mechanisms (1) placed in series and synchronised.

17. The rotating machine according to claim 15, wherein the machine comprises several pairs of mechanisms (1), placed in series and synchronised within each pair, the several pairs of mechanisms being placed in parallel and synchronised among themselves.

18. The rotating machine according to claim 15, wherein the machine is a two-stroke motor comprising two mechanisms (1), wherein the first two eccentric elements (14) are placed at half-turn intervals, and wherein the second two eccentric elements (24) are placed at half-turn intervals.

19. The rotating machine according to claim 15, wherein the machine is a four-stroke motor comprising four mechanisms (1), wherein the first four eccentric elements (14) are placed at quarter-turn intervals, and wherein the second four eccentric elements (24) are placed at quarter-turn intervals.

20. The rotating machine according to claim 15, comprising at least another pendulum, wherein the base (3) is common to the pendulum and the at least another pendulum (4).

21. An implementation method of the mechanism (1) according to claim 1, wherein the method comprises the following successive steps:
- a positioning step of the first and second eccentric elements (14; 24) one in relation to the other and in relation to the first and second cog wheels (12; 22), in order that the first and second moments (M1; M2) of gravity force (P1; P2) of the first and second eccentric elements (14; 24) have a same value and a same direction, both being variable depending on angular position of the first and second eccentric elements (14; 24) around the first and second axes (A1; A2), and that for each angular position of the first and second cog wheels (12; 22) and of the first and second eccentric elements (14; 24) around the first and second axes (A1; A2), the mechanism (1) presents the equilibrium configuration at rest;
- a rotation (R1; R2) start-up step of the first and second cog wheels (12; 22) and of the first and second eccentric elements (14; 24) around the first and second axes (A1; A2), wherein the mechanism (1) quits the equilibrium configuration and sets in motion; and
- an operating step, wherein the rotation (R1; R2) of the first and second eccentric elements (14; 24) around the first and second axes (A1; A2) generates centrifugal force within the mechanism (1), the first and second eccentric elements (14; 24) following an elliptical movement, whereas the pendulum (4) follows the travel movement having a vertical component and a horizontal component.

* * * * *